United States Patent
Sandeen

[11] Patent Number: 6,033,000
[45] Date of Patent: Mar. 7, 2000

[54] CARRIER FOR BAKERY GOODS

[76] Inventor: Pauline F. Sandeen, 4312 Hampshire Ave., North, Crystal, Minn. 55428

[21] Appl. No.: 09/061,738

[22] Filed: Apr. 18, 1998

[51] Int. Cl.[7] ............... B65D 63/00; A45F 5/00
[52] U.S. Cl. ............................ 294/149; 294/165
[58] Field of Search ............ 294/27.1, 32, 137, 294/138, 145, 148–152, 157, 164, 165, 74

[56] References Cited

U.S. PATENT DOCUMENTS

| | | | |
|---|---|---|---|
| 1,839,636 | 1/1932 | Baker | 294/164 |
| 2,029,429 | 2/1936 | Koons | 294/145 |
| 2,532,306 | 12/1950 | Herbert | 294/150 |
| 2,687,321 | 8/1954 | Toffolon | 294/74 |
| 3,692,218 | 9/1972 | Friedman | 294/165 |
| 4,140,257 | 2/1979 | Peterson | 294/151 |
| 4,305,584 | 12/1981 | Leehan | 294/152 |
| 5,524,949 | 6/1996 | Mooney | 294/149 |
| 5,752,733 | 5/1998 | Marshall | 294/157 |

*Primary Examiner*—Dean J. Kramer
*Attorney, Agent, or Firm*—Angenehm Law Firm, Ltd.; N. Paul Friederichs, III

[57] ABSTRACT

A method and apparatus for selectively flexibly retaining a plurality of distinct containers for transport, the containers being of an non-predetermined size and shape, the method and apparatus allowing containers to be added or removed at the discretion of the user, and the containers being retained by engagement with and deformation of the carrier.

13 Claims, 2 Drawing Sheets

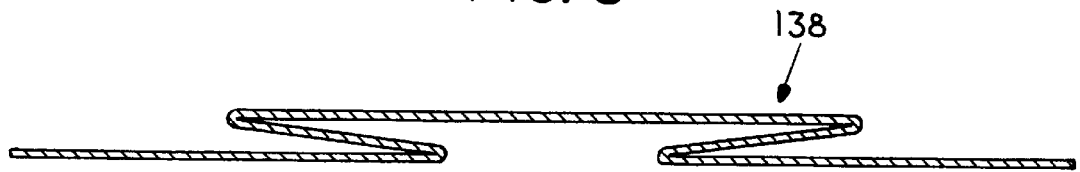
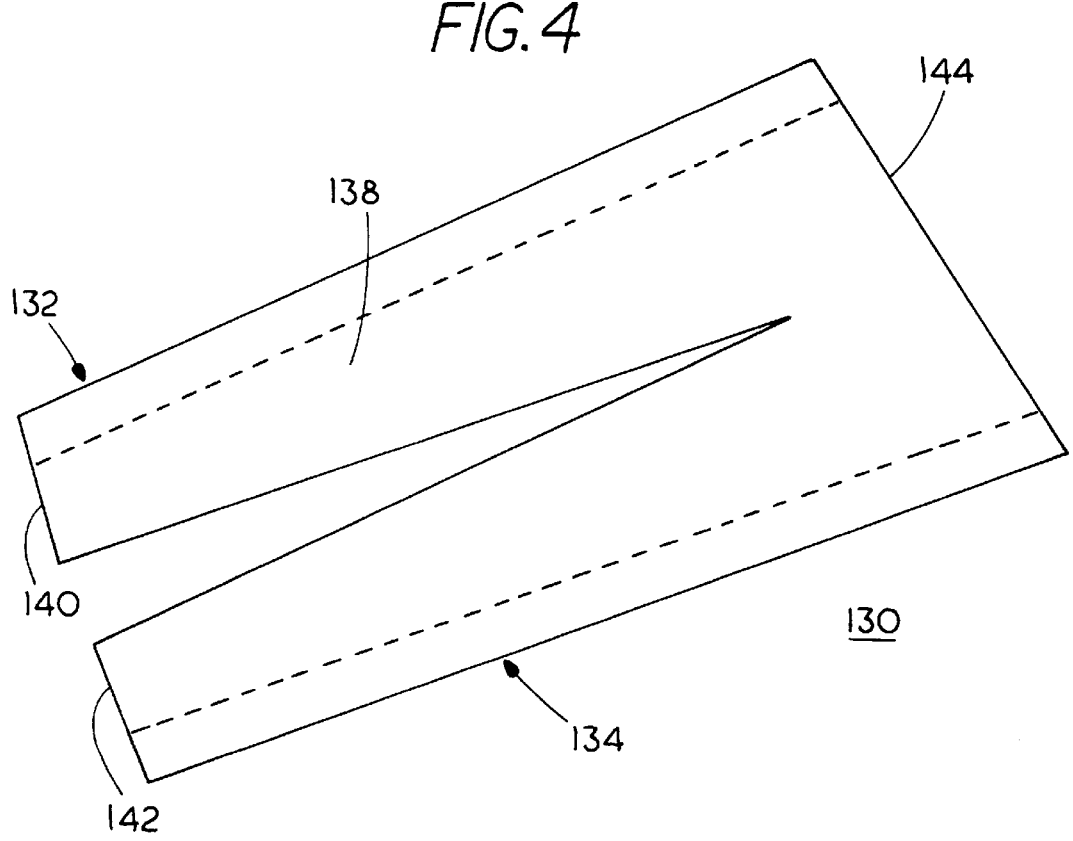

CARRIER FOR BAKERY GOODS

BACKGROUND OF THE INVENTION

The packaging of retail goods for the consumer has provided numerous problems and solutions. Commonly a retail shopper who has purchased goods at a retail store is presented with the purchases in any one of a variety of bags, the bags varying in size, shape, and material. While the common paper and plastic bags function quite well for most applications, there are shortcomings and problems with this method of packaging.

One of the problems with placing purchases in a shopping bag is that often one or more of the packages needs to remain in an upright position and is too large to fit in a standard sized bag so it cannot be so packed in a standard bag. When this happens, the one item must be carried separately and is therefore more difficult to transport. Should the container be coaxed in to a standard bag, it is often not stable and subject to being tipped or spilled. While careful packing can often minimize this problem, it does not obviate the problem.

Another difficulty occurs when the consumer purchases multiple items, each of which are packed in a separate smaller box, as often happens with bakery goods. Here the problem of spillage is manifest and the individual smaller boxes are of varying sizes so that the boxes cannot be easily contained as a unit for transport. Frequently, the boxes do not lend themselves for placement in a standard bag and even if the boxes would fit in a standard bag, they would be rather clumsy to transport. An additional problem with fresh from the oven bakery goods is that there is no air circulation, which can be detrimental to the baked goods. Not to mention the loss in advertising value of the fresh baked smell.

One solution to this problem is to contain the multiple small boxes with string or cord. It is, however, time consuming to cut the string the proper length and tie it around the boxes. Additionally, the string does not make a very good handle, particularly when the package becomes quite heavy. Unfortunately in today's market these activities are beyond the time limitations imposed on the typical worker.

SUMMARY OF THE INVENTION

The invention relates to a carrier for transporting a plurality of packed goods. More particularly, the invention is a carrier for transporting a plurality of containers of bakery goods and the like. The carrier provided in the current invention is a flexible open sided carrier adapted to transport multiple small boxes or the like in one convenient package with a comfortable handle for the consumer to carry the package.

The invention is a flexible carrier designed so that a stack of multiple packages can be placed on its base and the handles pulled upwardly to engage the sides of the boxes, retaining the boxes in a fixed relationship to both the other boxes and the base of the carrier. The user may then grasp the handles in a hand and transport the multiple boxes from the retail outlet without having to juggle a stack of multiple boxes. The handle portion being formed from a wide strip of material can be opened or closed to suit the consumer. Thus a collection of boxes of various sizes can be easily carried from the point of purchase. Additionally, the consumer can purchase some items from one retailer and then purchase more items from other retailers and simply add the boxes to the carrier without any additional packaging or repackaging.

BRIEF DESCRIPTION OF THE DRAWINGS

FIG. 3 is a cross sectional view of the of the invention taken along 3—3 of FIG. 1.

FIG. 4 is a plan view of one of the panels used to construct the preferred embodiment of the invention.

DESCRIPTION OF THE PREFERRED EMBODIMENT

The present invention, shown in various figures, is a carrier 110 for transporting a plurality of containers 122, 124 by placing the containers 122, 124 on the base 116 and extending the handles 118, 120 upwardly to deformably engage the periphery of the containers 122, 124 and form a unitary handle for ease of transport. The present invention restricts the movement of the containers 122, 124 with respect to each other and with respect to the carrier 110.

Figure 1:
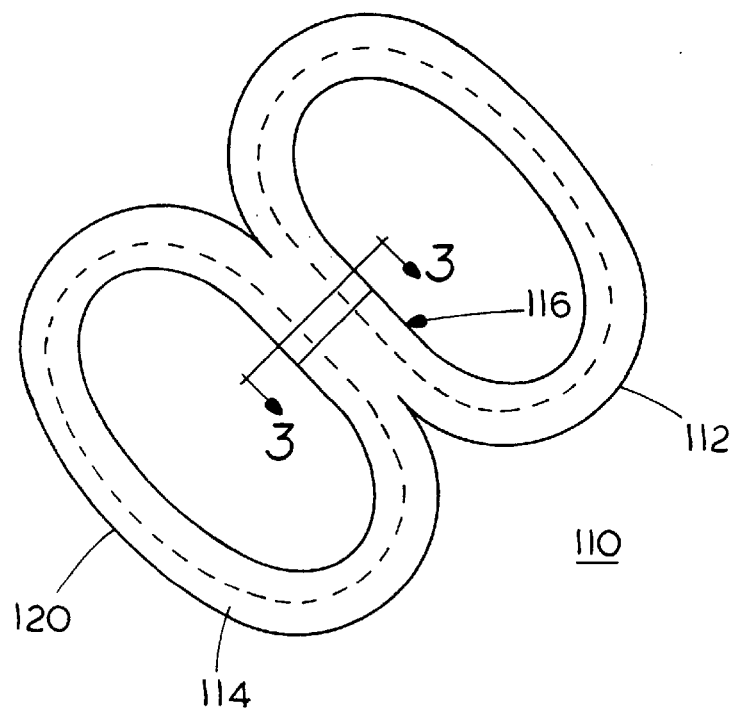
FIG. 1 shows a plan overhead view of the invention shown spread out and ready to accept a stack of packages.

FIG. 1 shows a preferred embodiment of the carrier 110. The carrier 110 consists of a first and second annular rings 112, 114 having a joined together part or base 116 and a separated part of the first and second annular rings 112, 114 forming first and second handles 118, 120. The stretched diameter of the openings in annular rings 112, 114 is between a quarter of the diameter of the goods to be carried and eight times the diameter of the goods to be carried and preferably is between half the diameter of the goods to be carried and between three times the diameter of the goods to be carried with a most preferred length of twenty-seven inches. The width of handles 118, 120 when laid flat (not in z-fold) is between ⅜ inch and thirty inches and preferably is between one inch and between twenty-four inches with a most preferred width of six inches.

Figure 2:
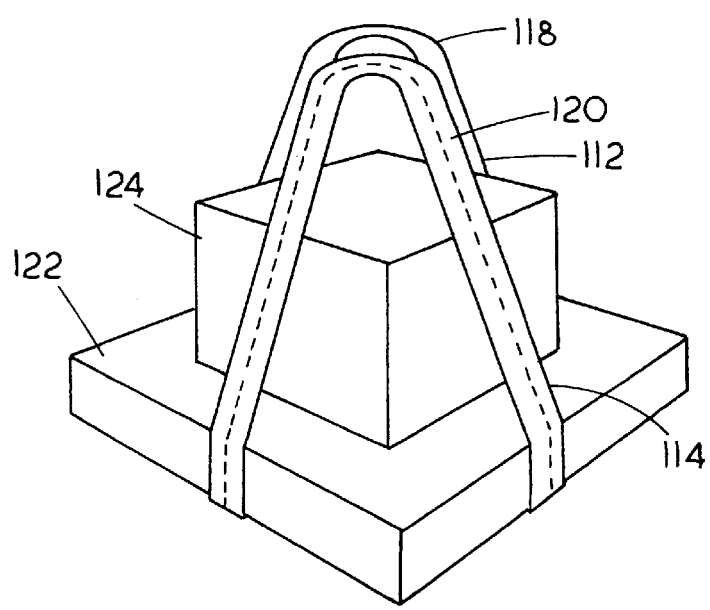
FIG. 2 shows a perspective view of the invention shown loaded with boxes ready for transport.

FIG. 2 shows the carrier 110 loaded with two containers 122, 124 and prepared for use. The first container 122 has been placed on the base 116 supporting the first container 122 which in turn, supports the second container 124. The carrier 110 annular rings 112, 114 have been extended upwardly to frictionally engage the first container 122 and the second container 124 retaining the containers 122, 124 in a relatively fixed position with respect to the base 116.

The carrier 110 is constructed from a thin flexible material, such as plastic or any other suitable material. While the carrier 110 could be constructed of paper, or other non-elastic material, it is, however, preferred that the construction material have some elasticity so that the carrier 110 will deform to better cradle the containers 122, 124 and return to its previous size and shape. The elasticity of the carrier 110 further provides for a more conforming engagement between the carrier 110 and the containers 122, 124 being carried. The plastic for construction of the carrier 110 is selected based on the cost and physical properties of the plastic, for example, flexibility, modulus of stretching, tear strength, etc. Cosmetic properties of the carrier 110 plastic may include color and texture. It is preferred that the plastic selected for the carrier 110 is recyclable such as a group 4 LDPE type plastic.

The carrier 110 can be constructed from sections sliced from a tube, slicing partially through to bifurcate the tube and form the handles 118, 120 of the carrier 110. With this construction, however, each annular ring 112, 114 is then a single thickness or material which when of the proper strength and elasticity will form a carrier 110, but, the single thickness of material through the handles 118, 120 have been found to be less comfortable for the user.

Preferably, the carrier 110 is constructed from two panels 130, of the type shown in FIG. 4. Each of the panels 130 can then be formed from a continuous sheet of plastic, or other suitable substance and each panel 130 partially slit to form the two half handles 132, 134. Two of the panels 130 can then be joined together at their respective base ends 144 and half handle ends 140, 142 to form a completed carrier. The panels 130 may be joined together by any suitable means that preferably forms a continuous seam, such as, heat sealing, adhesives, sewing, or less desirably metallic fasteners. When the panels 130 are constructed from a preferred plastic film, the plastic can be selected to be readily heat sealable to provide for convenient and rapid construction.

When constructed of a thin plastic, the carrier 110 would require inconveniently wide handles 118, 120, to provide sufficient strength to carry an average load of containers 122, 124. However, to overcome this limitation of materials, the half handles 132, 134 are each preferably folded into a "Z" fold to increase the strength while not increasing the actual width of the half handle 132, 134. By varying the width of the "Z" fold 138, the strength and deformability of the handle 118, 120 can be varied to suit the needs of the particular usage. The "Z" fold 138 in the half handles 132, 134 in addition to increasing the strength provides for a thicker more comfortable handle for the user. The "Z" folds 138 when engaging the sides of the containers 122, 124 can stretch and deform to more closely approximate the size and shape of the containers 122, 124.

While the width of the "Z" fold 138 can vary within a wide range, it has been found that the preferred size of the "Z" fold 138 is to reduce the width of the of the half handle 132, 134 to slightly more than one half of its unfolded width. This provides the maximum increase in strength while also providing six layers in the handle area to increase the comfort to the user and minimizing tearing of the handle 118, 120 when used.

When the preferred carrier 110 is constructed from panels 130, the pair of previously "Z" folded panels 130 are joined at their respective base ends 144 by overlapping the base ends 144 of a first panel 130 and a second panel 130 and heat sealed across the width of the base ends 144 to form the base 116. Similarly, the half handle ends 140, 142 of the first panel 130 are overlapped on the half handle ends 140, 142 of a second panel 130 and heat sealed across the respective widths of the half handle ends 140, 142 to form the handles 118, 120. When constructed in this manner, the "Z" fold of the panels 130 is also heat sealed in place.

Heat sealing is well known in the art of plastic fabrication and is commonly performed by passing the layers of plastic film to be sealed between rollers heated to a suitable temperature. The heated rollers partially melt the plastic film and fuse the multiple layers into one piece. The rollers may be plain or corrugate to emboss a pattern upon the sealed area.

In its use, after a consumer has selected and paid for his selections and the selections placed in containers 122, 124 of conventional design, a carrier 110 is taken from storage and placed on a convenient surface. The first container 122 is thence placed overlying the base 116 of the carrier 110, a second container 124 may then be placed atop the first container 122, additional containers 122 may also be added to the stack of containers. The handles 118, 120 are then lifted to engage the periphery of the containers 122, 124 and brought together forming a singular handle which may be grasped by the consumer to carry the carrier 110 and its contents. When needed, the containers 122, 124 may be shifted or rotated so that they are more convenient to carry in the carrier 110. Should the consumer purchase additional goods, additional containers 124 may be added to the carrier 110 without disturbing its functionality.

Should the consumer have an oddly shaped container or have difficulty carrying the carrier 110, the containers 122, 124 can be rearranged so that a plurality of vertices of the containers 122, 124 are engaged by the handles 118, 120 of the carrier 110. When so engaged, the "Z" fold 138 of the respective handles 118, 120 deforms to retain the vertex of the container 122 so that the container 122 does not shift and can be easily transported to another location.

After the consumer has transported the containers 122, 124 to the desired location, the containers 122, 124 can be removed from the carrier 110 and used or stored. The carrier 110 having served its purpose may now be disposed of, but, it is preferred that the carrier 110 is retained for reuse or recycling.

Although the present invention has been described with reference to preferred embodiments, workers skilled in the art will recognize changes may be made in form and detail without departing from the spirit and scope of the invention.

What is claimed is:

1. A carrier comprising:

at least one flexible portion, the portion comprising a base and a pair of arms extending from the base; each of the arms having a pair of "Z" shaped folds extending along the length of each respective arm and the respective arms forming a split open loop.

2. A carrier comprising:

a pair of elongate flexible annular rings, the annular rings joined together along less than three quarters of the peripheral edge of their respective circumferences so that the joined together portion forms a base area; whereby the portion of the elongate annular rings opposite the joined together portion is extended oppositely to form a handle, wherein each of said annular rings further has a tangential surface, said tangential surface further being folded into a "Z" shape.

3. The carrier as described in claim 2 wherein the "Z" shaped fold of the tangential surface reduced the width of said tangential surface.

4. The carrier as described in claim 2 wherein the "Z" fold in the tangential surface is retained in a folded position in the base area.

5. The carrier as described in claim 2 wherein the "Z" fold in the tangential surface is retained in a folded position at a location in each handle disposed opposite the base area.

6. The carrier as described in claim 2 wherein the "Z" shaped fold of the tangential surface is deformable to engage at least one container placed in the carrier.

7. The carrier as described in claim 6 wherein the "Z" shaped fold of the tangential surface engages at least one side of at least one container.

8. The carrier as described in claim 6 wherein the "Z" shaped fold of the tangential surface engages at least one vertex of at least one container.

9. The carrier as described in claim 2 wherein each of said annular rings is joined together between 10% and 25% of the circumference.

10. The carrier as described in claim 2 wherein each of said annular rings is constructed of a polymer.

11. The carrier as described in claim 10 wherein the polymer is low density polyethylene.

12. The carrier as described in claim 10 wherein the polymer is recyclable.

13. A carrier, comprising:

means for supporting a container: and means for securing the container to the support means, the securing means comprising a plurality of annular ring members extending from the supporting means, the annular ring members having a Z-shaped fold along the length thereof.

* * * * *